H. K. AUSTIN.
ATTACHMENT FOR TIRE INFLATING PUMPS.
APPLICATION FILED NOV. 12, 1909.

1,005,123.

Patented Oct. 10, 1911.

Witnesses
C. H. Walker.
Elmer King.

Inventor
Henry K. Austin
By Jno. B. Hodges
Attorney

UNITED STATES PATENT OFFICE.

HENRY K. AUSTIN, OF READING, MASSACHUSETTS.

ATTACHMENT FOR TIRE-INFLATING PUMPS.

1,005,123.　　　　　Specification of Letters Patent.　　Patented Oct. 10, 1911.

Application filed November 12, 1909. Serial No. 527,742.

*To all whom it may concern:*

Be it known that I, HENRY K. AUSTIN, of Reading, in the county of Middlesex and State of Massachusetts, have invented certain new and useful Improvements in Attachments for Tire-Inflating Pumps, of which the following is a specification.

This invention relates to air pumps used for inflating pneumatic tires, and it has for its object, to provide improved means for connecting the air delivering conduit of an inflating pump with a tire valve.

The invention consists in the improvements which I will now proceed to describe and claim.

Figure 1:
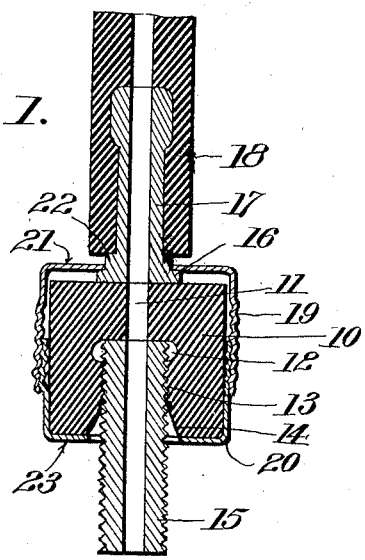
Figure 2:
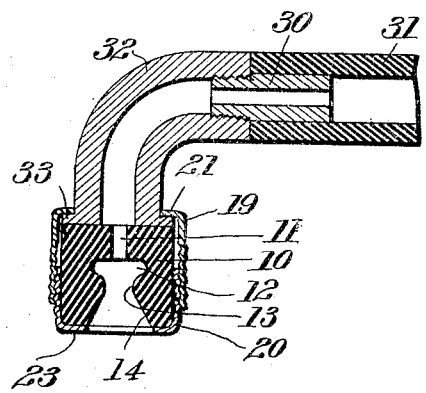

Of the accompanying drawings, forming a part of this specification, Figure 1 is a longitudinal sectional view illustrating my invention. Fig. 2 is a similar view of a modification.

Referring to the drawing, 10 designates a plug of elastic rubber having a substantially flat inner end and an air passage 11 extending therethrough from the inner end. Said air passage is provided with an enlargement 12, a contracted portion 13, and a second enlargement 14 of tapering form, the wider end of which is at the outer end of the section. This construction enables the section to be sprung or forced onto a valve nipple 15 of the form illustrated in Fig. 1, the enlargement 14 receiving the outer end of the nipple and facilitating the application of the coupling section thereto, while the contracted portion 13 hugs the periphery of the nipple 15, and thus maintains a firm and air tight connection between the plug 10 and the nipple.

In Fig. 1 the plug 10 is illustrated as resting against a seat formed by an annular flattened flange 16 of a rigid tube or nipple 17 inserted in the end of a flexible tube 18. A telescopic holder comprising an outer member 19 and an inner member 20 embraces the plug 10, and is adapted to press the inner end of the latter against the seat formed by flange 16. The outer member 19 has a head 21 which is perforated for the passage of the nipple and to engage a shoulder 22 formed above flange 16. The inner member 20 has a flange 23 which bears upon the marginal portion of the outer end of the plug 10. The members 19 and 20 are screw threaded so that relative rotation of said members in one direction is adapted to shorten the telescopic casing and thus press the inner end of the elastic plug 10 against the seat formed by flange 16. It is obvious that rotation of said members in the opposite direction effects their separation to permit removal of the plug.

In Fig. 2 I have illustrated a slight modification. In this form the nipple 30 is inserted in the outer end of flexible tube 31, and to the outer end of this nipple is attached a rigid tubular elbow 32, the outer end of which is provided with a flange 33 forming a seat for the plug 10.

I claim:

1. The combination with a rigid tube having a nipple at one end adapted to frictionally engage the bore of a rubber tube, the other end of said rigid tube being provided with a flattened annular flange forming a seat, of an elastic terminal coupling plug bearing upon said seat and provided with a bore to receive the nipple of a tire valve, and a telescopic casing of sheet metal formed of members independent of said tube and inclosing said plug, one of said members engaging said flange, said members having overlapping portions engaging each other at a point intermediate the ends of said plug, whereby the casing may be contracted to press said plug against said seat.

2. The combination with a rigid tube having a nipple at one end adapted to frictionally engage the bore of a rubber tube the other end of said rigid tube being provided with a flange, one face of which forms a seat, of an elastic terminal coupling plug bearing upon said seat and provided with a bore to receive the nipple of a tire valve, and a telescopic casing of sheet metal formed of members independent of said tube, and inclosing said plug, one of said members engaging said flange on the side opposite said seat, said members having overlapping interengaging portions, whereby the casing may be contracted to press said plug against said seat.

3. The combination with a rigid tube having a nipple at one end adapted to frictionally engage the bore of a rubber tube the other end of said rigid tube being provided with a flange, one face of which forms a seat, of an elastic terminal coupling plug bearing upon said seat and provided with a bore to receive the nipple of a tire valve, and a telescopic casing formed of members independent of said tube, and inclosing said plug, one of said members engaging said flange on the side opposite said seat, said members having overlapping portions engaging each other at a point intermediate the ends of said plug whereby the casing may be contracted to press said plug against said seat.

In testimony whereof I have affixed my signature, in presence of two witnesses.

HENRY K. AUSTIN.

Witnesses:
C. F. BROWN,
E. BATCHELDER.